United States Patent
Togashi et al.

(10) Patent No.: US 8,893,479 B2
(45) Date of Patent: Nov. 25, 2014

(54) SYSTEM OF TREATING EXHAUST GAS OF ENGINE

(75) Inventors: Taichi Togashi, Osaka (JP); Atsushi Ohta, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 153 days.

(21) Appl. No.: 13/583,374

(22) PCT Filed: Mar. 3, 2011

(86) PCT No.: PCT/JP2011/054853
§ 371 (c)(1),
(2), (4) Date: Sep. 7, 2012

(87) PCT Pub. No.: WO2011/111591
PCT Pub. Date: Sep. 15, 2011

(65) Prior Publication Data
US 2012/0324871 A1    Dec. 27, 2012

(30) Foreign Application Priority Data

Mar. 9, 2010   (JP) ................................ 2010-052003

(51) Int. Cl.
*F01N 3/00*   (2006.01)
*F01N 9/00*   (2006.01)
(Continued)

(52) U.S. Cl.
CPC .......... *F02D 41/029* (2013.01); *F01N 2240/36* (2013.01); *F01N 9/002* (2013.01); *Y02T 10/47* (2013.01); *Y02T 10/42* (2013.01); *F02D 41/10* (2013.01); *F02M 25/07* (2013.01); *F01N 3/0235* (2013.01); *F02D 41/0002* (2013.01); *F02D 41/22* (2013.01); *F01N 1/165* (2013.01)
USPC ................... 60/295; 60/285; 60/292; 60/297; 60/311; 60/324; 123/320; 123/683; 123/689

(58) Field of Classification Search
CPC ................................................. F01N 2900/16
USPC ........... 60/285, 291, 292, 295, 297, 311, 324; 123/320, 682, 683, 689
See application file for complete search history.

(56) References Cited

U.S. PATENT DOCUMENTS 6,931,842 B2 *   8/2005   Ohtake et al. .................... 60/295
7,059,113 B2 *   6/2006   Hirota et al. ..................... 60/277
(Continued)

FOREIGN PATENT DOCUMENTS

JP    02-294511    12/1990
JP    2002-276405    9/2002
(Continued)

OTHER PUBLICATIONS

International Search Report for International Application No. PCT/JP2011/054853, Japanese Patent Office, mailed May 17, 2011, 4 pages.

(Continued)

*Primary Examiner* — Binh Q Tran
(74) *Attorney, Agent, or Firm* — Sterne, Kessler, Goldstein & Fox P.L.L.C.

(57) ABSTRACT

In order to relief a sudden change of engine sound during the transition to recovery control of a particulate removing filter or during returning from the recovery control, a system of treating exhaust gas of an engine includes an exhaust-gas particulate removing filter in an exhaust path, closes down the opening of an inlet throttle valve or an exhaust throttle valve to a recovery opening smaller than a normal opening during recovery of the particulate removing filter, and returns the opening from the recovery opening to the normal opening after the recovery of the particulate removing filter. The opening of the inlet throttle valve or the exhaust throttle valve during the closing process from the normal opening to the recovery opening and during the returning process from the recovery opening to the normal opening is changed at a gradually decreasing or gradually increasing rate of change of the opening.

2 Claims, 6 Drawing Sheets

(51) Int. Cl.
  *F02D 41/02* (2006.01)
  *F01N 3/023* (2006.01)
  *F02D 41/00* (2006.01)
  *F01N 1/16* (2006.01)
  *F02D 41/10* (2006.01)
  *F02M 25/07* (2006.01)
  *F02D 41/22* (2006.01)

(56) References Cited

U.S. PATENT DOCUMENTS

| | | | |
|---|---|---|---|
| 7,246,485 B2 * | 7/2007 | Ohki et al. | 60/285 |
| 7,395,660 B2 * | 7/2008 | Kogo et al. | 60/295 |
| 7,877,985 B2 * | 2/2011 | Hashizume | 60/292 |
| 8,001,774 B2 * | 8/2011 | Onodera et al. | 60/295 |
| 2010/0043401 A1 | 2/2010 | Der Matheossian | |

FOREIGN PATENT DOCUMENTS

| | | |
|---|---|---|
| JP | 2004-301009 | 10/2004 |
| JP | 2005-282535 | 10/2005 |
| JP | 2008-008241 A | 1/2008 |
| JP | 2008-180095 | 8/2008 |
| JP | 2009-150278 A | 7/2009 |

OTHER PUBLICATIONS

Office Action for corresponding Japanese Appl. 2010-052003, "Notice of Reasons for Refusal," shipping date: Feb. 18, 2014, 2 pages.

* cited by examiner

SYSTEM OF TREATING EXHAUST GAS OF ENGINE

TECHNICAL FIELD

The present invention relates to an exhaust gas processing system.

BACKGROUND ART

Conventionally, an art is known reducing PM (Particulate matter) included in exhaust gas of a diesel engine with a particulate removing filter referred to as a DPF (Diesel Particulate Filter).

When the temperature of the exhaust gas is higher than regeneration temperature of the DPF, the PM collected in the DPF can be made harmless and removed. On the other hand, when the temperature of the exhaust gas is lower than regeneration temperature of the DPF, the PM collected in the DPF cannot be made harmless and removed. Then, in this case, as regeneration control of the DPF, the temperature of the exhaust gas must be made higher than the regeneration temperature regularly by using EGR and exhaust gas with excessive fuel so as to make the PM collected in the DPF harmless and remove it. For example, the Japanese Patent Laid Open Gazette 2002-276405 discloses the construction in which an inlet throttle valve or an exhaust throttle valve of a diesel engine is throttled so as to raise temperature of exhaust gas, thereby performing regeneration control of a DPF.

PRIOR ART REFERENCE

Patent Literature

Patent Literature 1: the Japanese Patent Laid Open Gazette 2002-276405

DISCLOSURE OF INVENTION

Problems to be Solved by the Invention

However, the construction disclosed in the Japanese Patent Laid Open Gazette 2002-276405 only switches the opening of the inlet throttle valve or the exhaust throttle valve between normal opening (opening in the case in which the DPF is not regenerated, hereinafter referred to as "normal opening") and transient opening (opening in the case in which the DPF is regenerated, hereinafter referred to as "transient opening"). Then, the construction is disadvantageous because engine noise changes suddenly following the switch of the opening of the inlet throttle valve or the exhaust throttle valve between normal opening and an operator feels disorder by the sudden change of the engine noise.

The purpose of the present invention is to provide an exhaust gas processing system which can ease sudden change of engine noise at the time of shifting to regeneration control of a particulate removing filter or returning from the regeneration control.

Means for Solving the Problems

According to the present invention, in an exhaust gas processing system for an engine in which a particulate removing filter for exhaust gas is provided in an exhaust passage, and in a case of regeneration of the particulate removing filter, an intake throttle valve or an exhaust throttle valve is throttled to a regeneration opening smaller than a normal opening and the valve is returned from the regeneration opening to the normal opening after regenerating the particulate removing filter, the opening of the intake throttle valve or the exhaust throttle valve in a throttle process from the normal opening to the regeneration opening and a return process from the regeneration opening to the normal opening is changed with an opening change rate which decreases or increases gradually.

According to the present invention, preferably, the intake throttle valve or the exhaust throttle valve set at the regeneration opening is returned to the normal opening when acceleration request or loading request is inputted while the regeneration control of the particulate removing filter is performed, the intake throttle valve or the exhaust throttle valve is throttled to the regeneration opening again when the acceleration request or the loading request is canceled, the opening change rate is set a normal opening change rate or a transient opening change rate larger than the normal opening change rate, and the opening change rate at the throttle process and the return process of the intake throttle valve or the exhaust throttle valve is switched from the normal opening change rate to the transient opening change rate in a period after starting the regeneration control of the particulate removing filter from initial input of the acceleration request or the loading request to end of the regeneration control.

According to the present invention, preferably, the opening change rate is switched from the normal opening change rate to the transient opening change rate when the opening of the intake throttle valve or the exhaust throttle valve with the transient opening change rate exceeds that with the normal opening change rate.

Effect of the Invention

According to the exhaust gas processing system of the present invention, sudden change of engine noise at the time of shifting to the regeneration control of the particulate removing filter or returning from the regeneration control can be eased.

According to the exhaust gas processing system of the present invention, the time until restarting the regeneration process of the particulate removing filter by throttling the intake throttle valve or the exhaust throttle valve can be shortened. Accordingly, the temperature of the exhaust gas can be raised quickly to the regeneration temperature after finishing the acceleration or after releasing the load.

According to the exhaust gas processing system of the present invention, the momentary reduction of the opening of the intake throttle valve or the exhaust throttle valve following the switch of the opening change rate can be prevented.

DETAILED DESCRIPTION OF THE INVENTION

Figure 1:
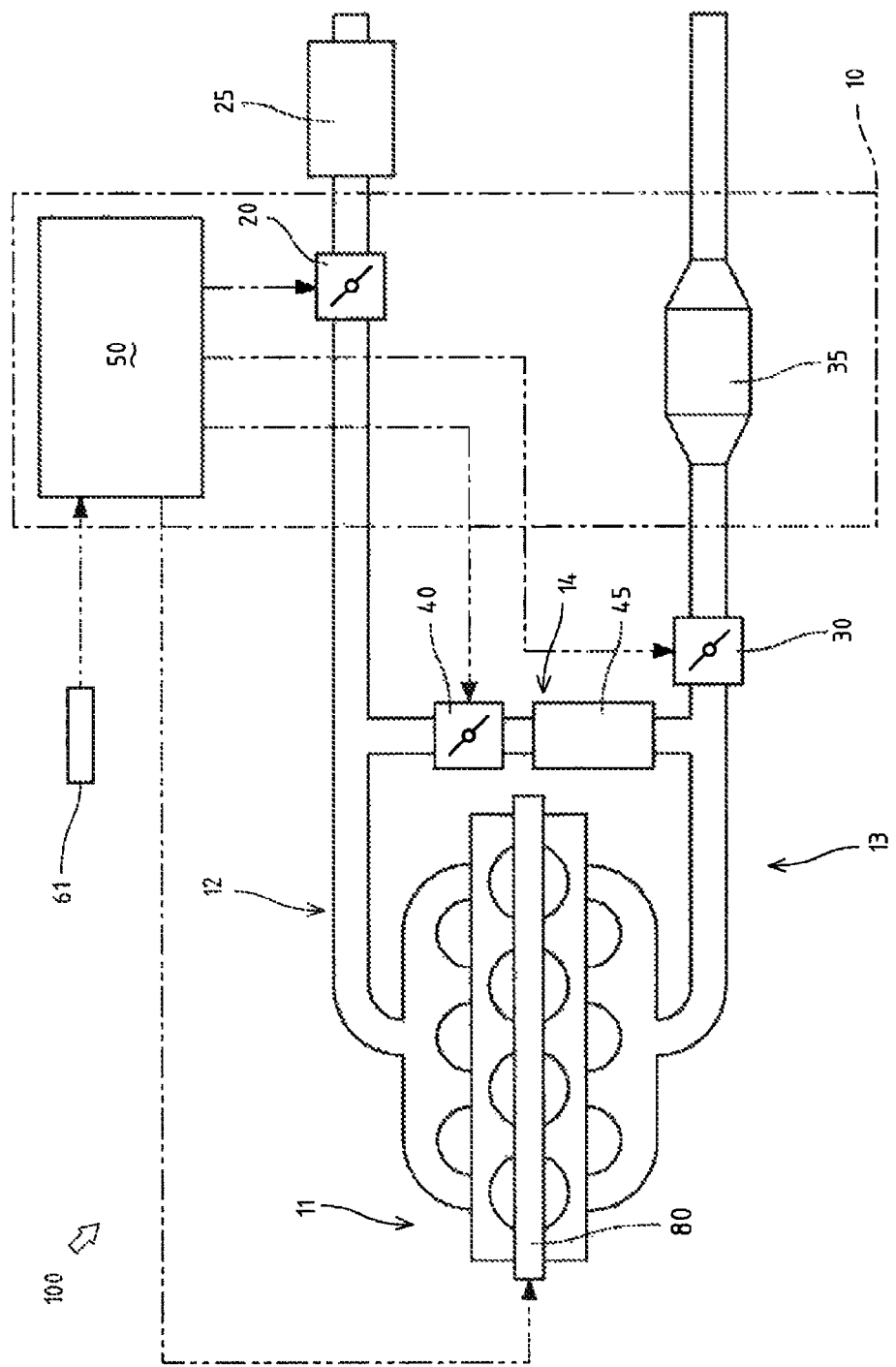
FIG. 1 A schematic drawing of an engine having an exhaust gas processing system which is an embodiment of the present invention.

An explanation will be given on an engine 100 having an exhaust gas processing system 10 which is an embodiment of the present invention referring to FIG. 1.

The engine 100 includes an engine body 11, an intake route 12, an exhaust route 13, an EGR route 14 and an ECU (Engine Control Unit) 50.

The intake route 12 is connected to an intake manifold of the engine body 11, and has an air cleaner 25 and an intake throttle valve 20. The intake throttle valve 20 is arranged downstream the air cleaner 25 in the intake route 12.

The exhaust route 13 is connected to an exhaust manifold of the engine body 11, and has an exhaust throttle valve 30 and a DPF (Diesel Particulate Filter) 35 as a particulate removing filter. The exhaust throttle valve 30 is arranged upstream the DPF 35 in the exhaust route 13.

The EGR route 14 is connected to the part of the intake route 12 downstream the intake throttle valve 20 and connected to the part of the exhaust route 13 upstream the exhaust throttle valve 30, and has an EGR valve 40 and an EGR cooler 45.

The ECU 50 is a control means of the engine 100 and is connected to the intake throttle valve 20, the exhaust throttle valve 30, the EGR valve 40, an engine speed sensor 61 and a fuel injection device 80. The ECU 50 controls the opening of the intake throttle valve 20, the opening of the exhaust throttle valve 30, and the opening of the EGR valve 40.

The exhaust gas processing system 10 includes the ECU 50, the intake throttle valve 20 and the DPF 35, and performs regeneration control which raises temperature of exhaust gas so as to make harmless PM (Particulate matters) collected in the DPF 35 and remove them.

The exhaust gas processing system 10 in this embodiment performs the regeneration control as discussed below. Namely, in the case of regenerating the DPF 35, when the temperature of the exhaust gas is lower than regeneration temperature of the DPF 35, a throttle opening S of the intake throttle valve 20 is closed from a normal opening Sn to a regeneration opening Sb so as to raise the temperature of the exhaust gas, whereby the PM collected in the DPF 35 are made harmless and removed. In this case, the regeneration opening Sb is smaller than the normal opening Sn.

The exhaust gas processing system 10 in this embodiment changes the throttle opening S of the intake throttle valve 20 so as to raise the temperature of the exhaust gas. However, instead of this construction, the throttle opening of the exhaust throttle valve 30 may alternatively be changed.

In the regeneration control in this embodiment, over the throttle process from the normal opening Sn to the regeneration opening Sb, the throttle opening S of the intake throttle valve 20 is reduced gradually with an opening change rate R, and over the return process from the regeneration opening Sb to the normal opening Sn, the throttle opening S of the intake throttle valve 20 is increased gradually with the opening change rate R.

Figure 2:
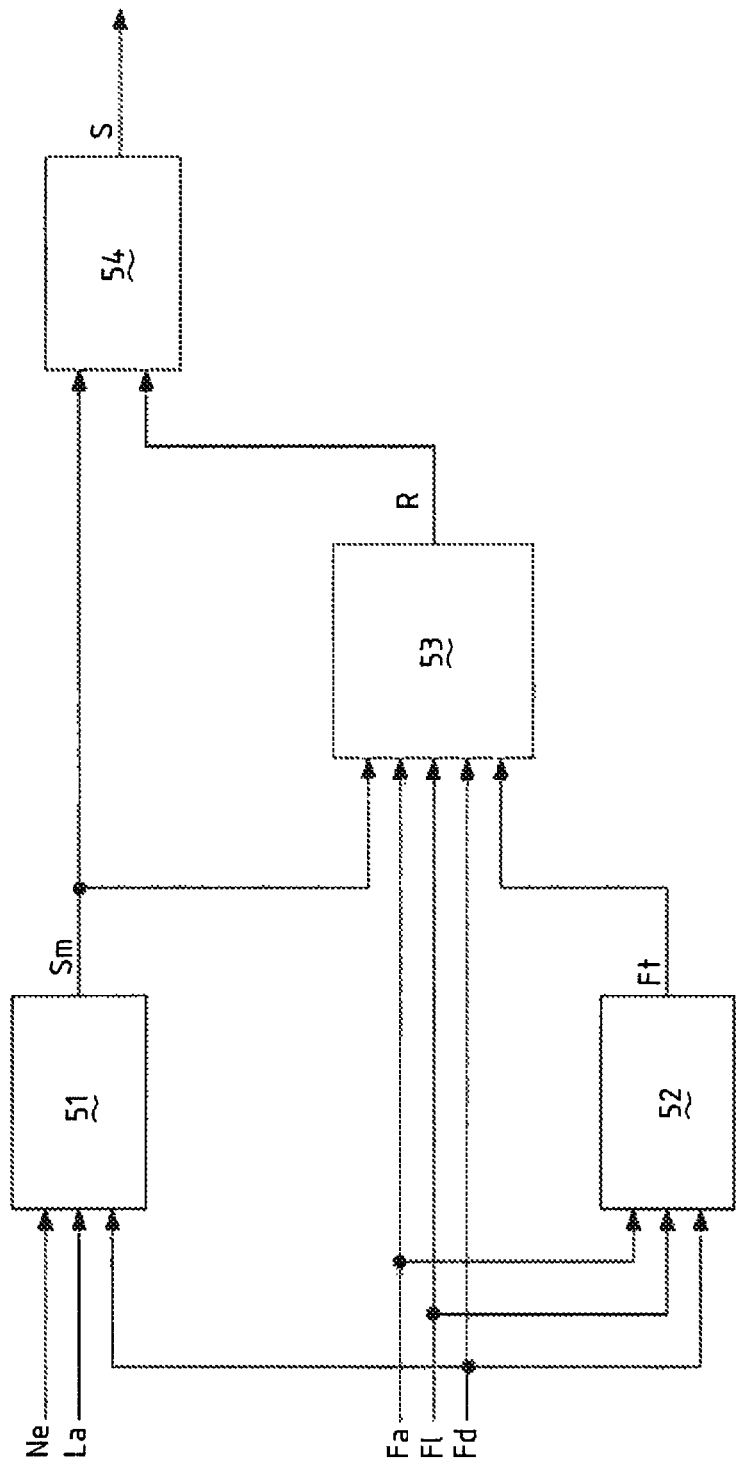
FIG. 2 A block diagram of an ECU of the exhaust gas processing system.

An explanation will be given on the construction of the ECU 50 referring to FIG. 2.

The ECU 50 has a target throttle opening calculation part 51, a transient retention judgment part 52, an opening change rate switching judgment part 53 and a throttle opening calculation part 54.

The ECU 50 has an acceleration flag Fa as an acceleration request, a loading flag Fl as a loading request, a regeneration control flag Fd, and a transient retention flag Ft.

Furthermore, the ECU 50 has a normal opening change rate Rn and a transient opening change rate Rt as the opening change rate R.

In the regeneration control, the ECU 50 calculates the throttle opening S at each sampling period.

The ECU 50 detects an engine speed Ne with the engine speed sensor 61, and calculates a load factor La which is a ratio of an actual fuel injection amount to the maximum fuel injection amount determined for each target engine speed Nem.

The acceleration flag Fa is a flag judging whether the engine 100 is accelerated or not. When the engine speed Ne is increased for not less than a predetermined value in a predetermined period, the ECU 50 judges that the engine 100 is accelerated, and the acceleration flag Fa turns into 1.

The loading flag Fl is a flag judging whether any load is applied on the engine 100 or not. When the load factor La is increased for not less than a predetermined value in a predetermined period, the ECU 50 judges that any load is applied on the engine 100, and the loading flag Fl turns into 1.

The regeneration control flag Fd is a flag judging whether the regeneration control is performed or not. The ECU 50 judges whether the regeneration control is performed or not based on pressure difference between exhaust pressure sensors (not shown) provided before and behind the DPF 35 or assessed value of PM stacking amount. When the regeneration control is judged to be performed, the regeneration control flag Fd turns into 1.

The transient retention flag Ft is a flag indicating the state in which the engine 100 is accelerated or the state in which any load is applied on the engine 100 in the regeneration control. The ECU 50 makes the transient retention flag Ft turn into 1 based on transient retention judgment control discussed later.

The normal opening change rate Rn is the opening change rate R reducing or increasing gradually the throttle opening S of the intake throttle valve 20, and is the opening change rate R employed from the start of the regeneration control. On the other hand, the transient opening change rate Rt is the opening change rate R having larger opening change rate than the normal opening change rate Rn.

The target throttle opening calculation part 51 calculates a target throttle opening Sm from the engine speed Ne, the load factor La and the regeneration control flag Fd.

The transient retention judgment part 52 makes the transient retention flag Ft turn into 0 or 1 from the acceleration flag Fa, the loading flag Fl and the regeneration control flag Fd based on the transient retention judgment control discussed later.

The opening change rate switching judgment part 53 switches the opening change rate R to the normal opening change rate Rn or the transient opening change rate Rt from the target throttle opening Sm, the acceleration flag Fa, the loading flag Fl, the regeneration control flag Fd and the transient retention flag Ft based on opening rate switching control discussed later.

The throttle opening calculation part 54 calculates the throttle opening S from the target throttle opening Sm calculated by the target throttle opening calculation part 51 and the normal opening change rate Rn or the transient opening change rate Rt calculated by the opening change rate switching judgment part 53.

Figure 3:
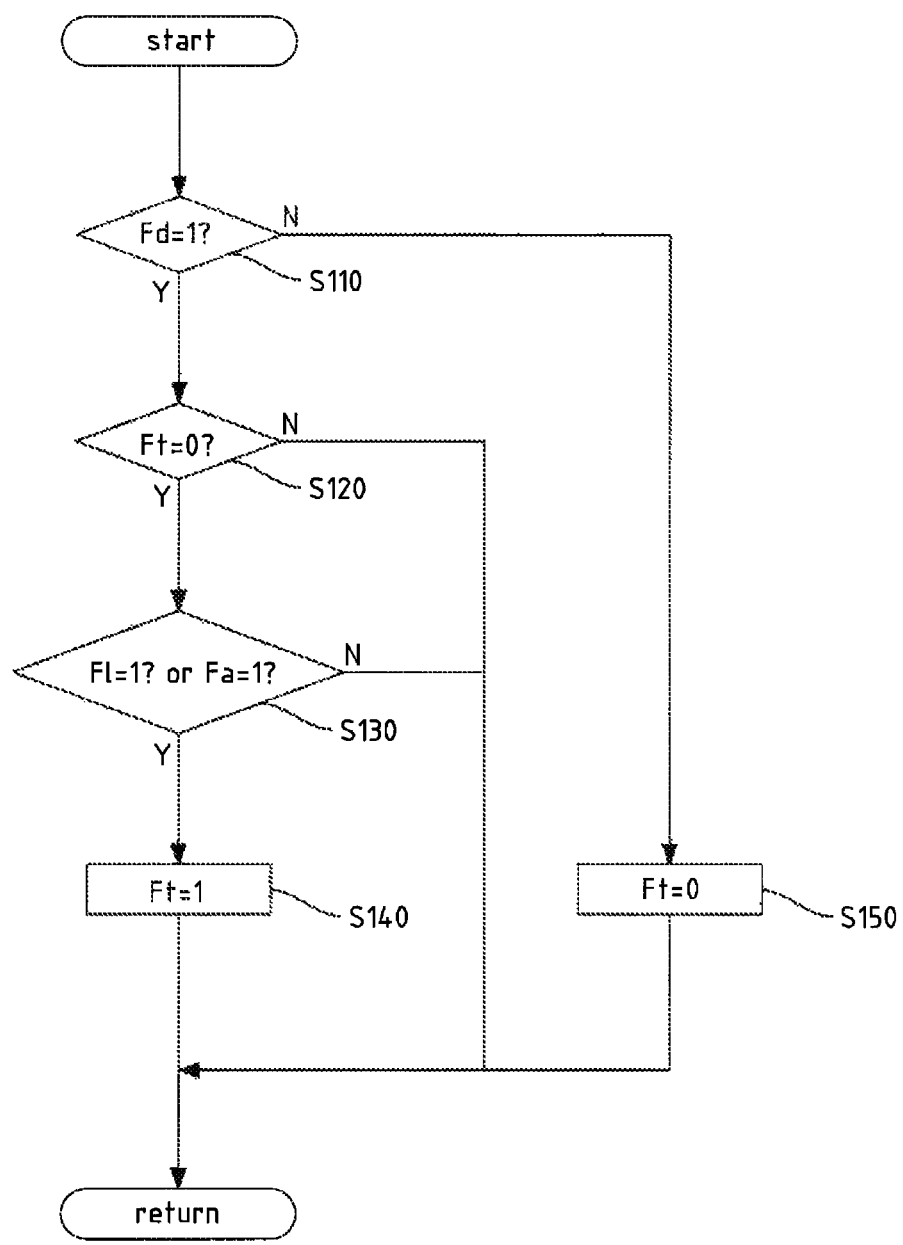
FIG. 3 A flow chart of transient retention judgment control.

An explanation will be given on the transient retention judgment control referring to FIG. 3.

The transient retention judgment part 52 of the ECU 50 has a function making the transient retention flag Ft turn into 0 or 1 as the transient retention judgment control.

Firstly, the transient retention judgment part 52 confirms whether the regeneration control flag Fd is 0 or 1 at a step S110. When the regeneration control flag Fd is 1, the control shifts to a step S120. On the other hand, when the regeneration control flag Fd is 0, the transient retention flag Ft turns into 0 at a step S150.

Then, the transient retention judgment part 52 confirms whether the transient retention flag Ft is 0 or 1 at the step S120. When the transient retention flag Ft is 0, the control shifts to a step S130. Next, the transient retention judgment part 52 confirms whether the acceleration flag Fa is 1 or not and whether the loading flag Fl is 1 or not at the step S130. When at least one of the acceleration flag Fa and the loading flag Fl is 1, the control shifts to a step S140. Then, the transient retention judgment part 52 makes the transient retention flag Ft turn into 1 at the step S140.

Figure 4:
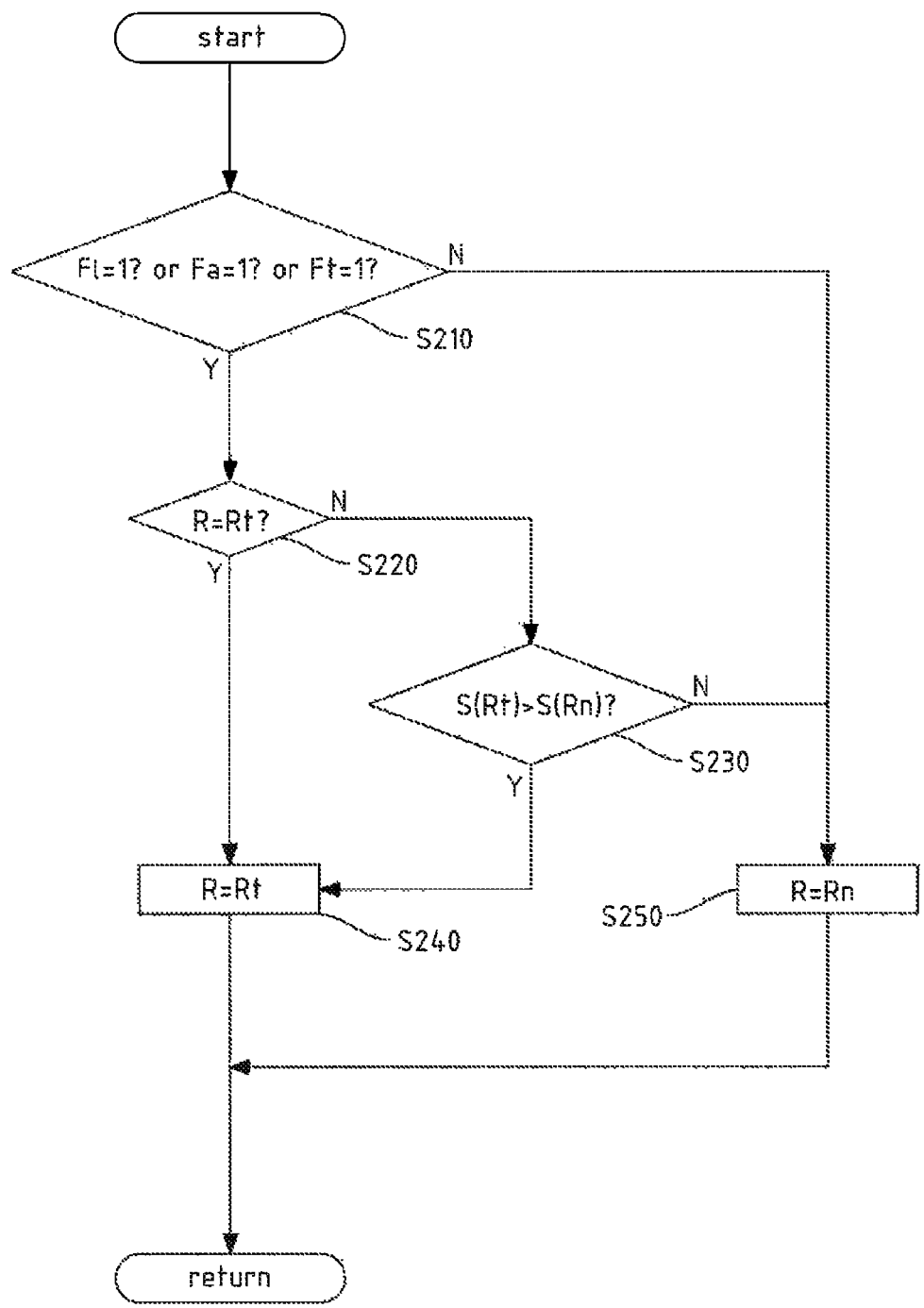
FIG. 4 A flow chart of opening rate switching control.

An explanation will be given on the opening rate switching control referring to FIG. 4.

The opening change rate switching judgment part 53 of the ECU 50 has a function switching the opening change rate R to the normal opening change rate Rn or the transient opening change rate Rt as the opening rate switching control.

Firstly, the opening change rate switching judgment part 53 confirms whether the loading flag Fl, the acceleration flag Fa and the transient retention flag Ft are 1 or not at a step S210. When at least one of the loading flag Fl, the acceleration flag Fa and the transient retention flag Ft is 1, the control shifts to a step S220. On the other hand, when the loading flag Fl, the acceleration flag Fa and the transient retention flag Ft are not 1, the control shifts to a step S250 and the opening change rate R is switched to the normal opening change rate Rn.

At the step S220, the opening change rate switching judgment part 53 confirms whether the opening change rate R is the transient opening change rate Rt or not. When the opening change rate R is not the transient opening change rate Rt (the opening change rate R is the normal opening change rate Rn), the control shifts to a step S230.

Then, the opening change rate switching judgment part 53 calculates a throttle opening S(Rt) at the transient opening change rate Rt and a throttle opening S(Rn) at the normal opening change rate Rn on operation and confirms whether the throttle opening S(Rt) at the transient opening change rate Rt is larger than the throttle opening S(Rn) at the normal opening change rate Rn or not. When the throttle opening S(Rt) is larger than the throttle opening S(Rn), the control shifts to a step S240. On the other hand, when the throttle opening S(Rt) is not larger than the throttle opening S(Rn), the control shifts to the step S250.

Next, the opening change rate switching judgment part 53 switches the opening change rate R to the transient opening change rate Rt at the step S240.

An explanation will be given on an embodiment of the regeneration control referring to FIGS. 5 and 6.

Figure 5:
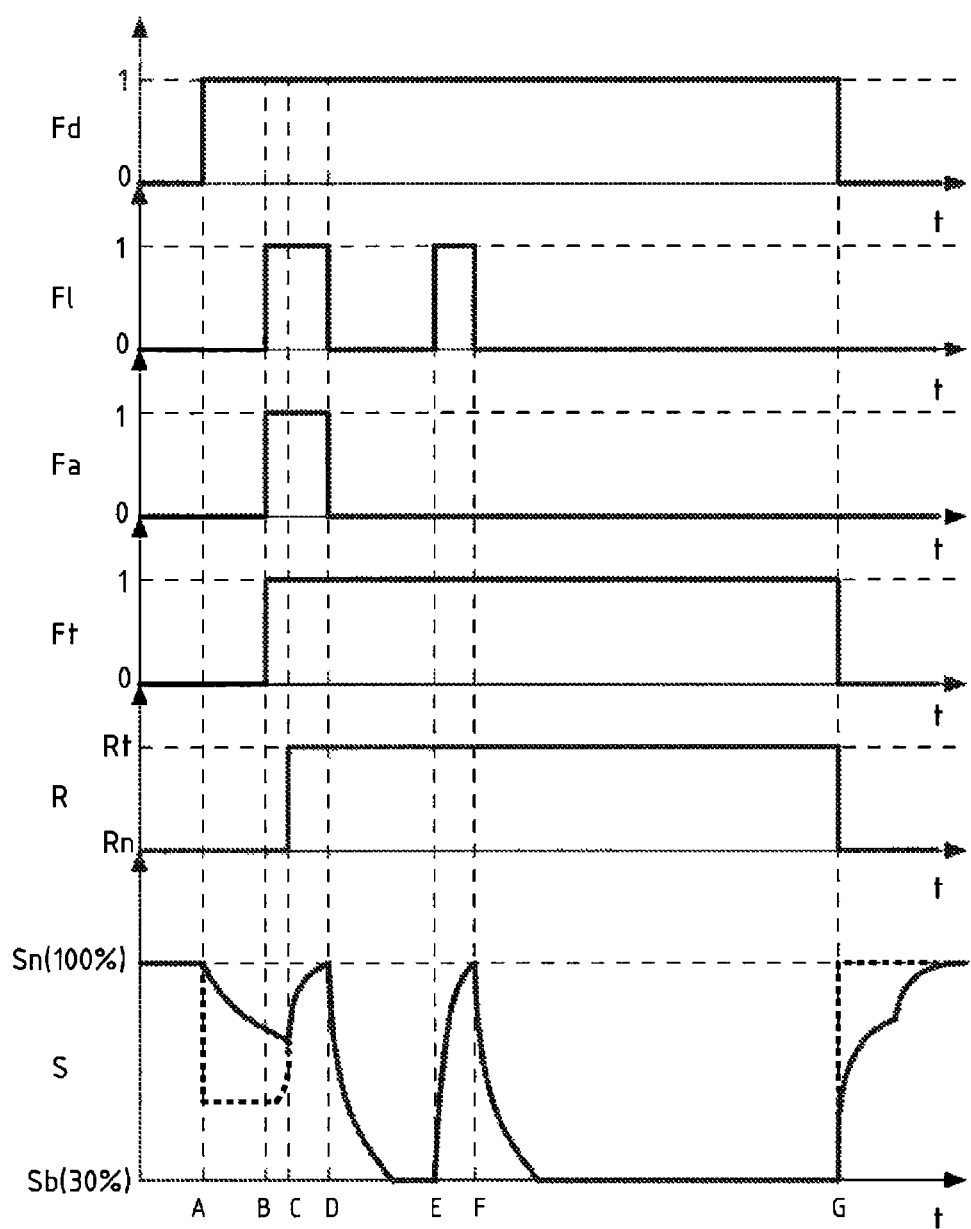
FIG. 5 A graph of time series variation of regeneration control.
Figure 6:
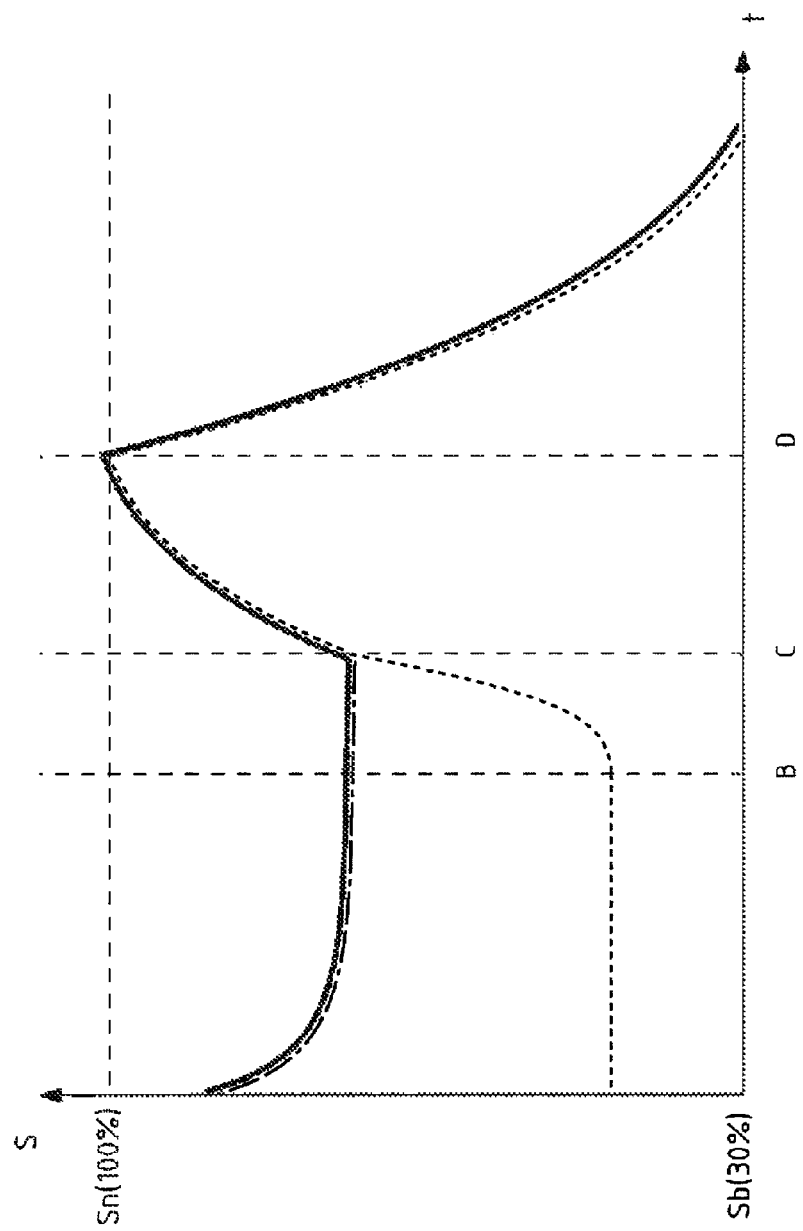
FIG. 6 A graph of time series variation enlarging FIG. 5 partially.

FIGS. 5 and 6 show time series variation of the regeneration control flag Fd, the loading flag Fl, the acceleration flag Fa, the transient retention flag Ft, the opening change rate R (the normal opening change rate Rn or the transient opening change rate Rt) and the throttle opening S. An explanation will be given on the throttle opening S following the time series (points A to G passing successively). Broken lines in FIGS. 5 and 6 show the throttle opening S(Rt) at the transient opening change rate Rt, and an alternate long and short dash line in FIG. 6 shows the throttle opening S(Rn) at the normal opening change rate Rn.

At the point A, since the regeneration control flag Fd becomes 1, the regeneration control is started and the throttle opening S is reduced gradually from the normal opening Sn (100%) to the regeneration opening Sb (30%) with the normal opening change rate Rn. In this embodiment, the normal opening Sn is 100% of the opening of the intake throttle valve 20, and the regeneration opening Sb is 30% of the opening of the intake throttle valve 20.

At the point B, since a loading request is inputted firstly in the regeneration control so that the acceleration flag Fa and the loading flag Fl become 1, the transient retention flag Ft becomes 1 by the transient retention judgment control.

In the regeneration control, when the engine 100 is accelerated or any load is applied on the engine 100, the temperature of the exhaust gas is raised so that the PM can be made harmless and removed. Accordingly, it is necessary to increase the throttle opening S gradually to the normal opening Sn.

However, in this embodiment, the throttle opening S is increased gradually to the normal opening Sn at the point C after passing a predetermined time from the point B, and only the transient retention flag Ft becomes 1 at the point B. The throttle opening S is reduced gradually toward the regeneration opening Sb from the point B to the point C.

At the point C, the throttle opening S(Rt) at the transient opening change rate Rt and the throttle opening S(Rn) at the normal opening change rate Rn are calculated on operation. Since the throttle opening S(Rt) at the transient opening change rate Rt becomes larger than (exceeds) the throttle opening S(Rn) at the normal opening change rate Rn, the opening change rate R is switched from the normal opening change rate Rn to the transient opening change rate Rt by the opening change rate switching control.

In this case, the throttle opening S is increased gradually toward the normal opening Sn with the transient opening change rate Rt.

At the point D, since the acceleration request and the loading request are canceled and the loading flag Fl and the acceleration flag Fa become 0, the throttle opening S is reduced gradually from the normal opening Sn to the regeneration opening Sb with the transient opening change rate Rt.

At the point E, since the loading request is inputted and the loading flag Fl becomes 1, the throttle opening S is increased gradually from the regeneration opening Sb to the normal opening Sn with the transient opening change rate Rt.

At the point F, since the loading request is canceled and the loading flag Fl becomes 0, the throttle opening S is reduced gradually from the normal opening Sn to the regeneration opening Sb with the transient opening change rate Rt.

At the point G, since the regeneration control flag Fd becomes 0, the regeneration control is finished. Simultaneously, by the opening change rate switching control, the opening change rate R is switched from the transient opening change rate Rt to the normal opening change rate Rn. Then, throttle opening S is increased gradually from the regeneration opening Sb to the normal opening Sn with the normal opening change rate Rn.

The construction brings following effects.

In the case of the regeneration control of the DPF 35, the throttle opening S of the intake throttle valve 20 is reduced or increased gradually with the predetermined opening change rate R, whereby sudden change of engine noise in the case of the shift to the regeneration state with the regeneration opening Sb and the case of the return from the regeneration state with the regeneration opening Sb to that with the normal opening Sn.

At the period after starting the regeneration control of the DPF 35 from the initial input of the acceleration flag Fa or the loading flag Fl to the finish of the regeneration, the throttle opening S is reduced or increased gradually with the transient opening change rate Rt larger than the normal opening change rate Rn, whereby the responsibility of the intake throttle valve 20 is improved and the time until the next regeneration control with the regeneration opening Sb is shortened. Accordingly, the temperature of the exhaust gas can be raised quickly to the regeneration temperature after finishing the acceleration or after releasing the load.

Furthermore, when the throttle opening S(Rt) at the transient opening change rate Rt exceeds the throttle opening S(Rn) at the normal opening change rate Rn, the opening change rate R is switched to the transient opening change rate Rt, whereby the momentary reduction of the throttle opening S of the intake throttle valve 20 following the switch of the opening change rate R can be prevented.

INDUSTRIAL APPLICABILITY

The present invention can be employed in an exhaust gas processing system performing regeneration control of a DPF by raising temperature of exhaust gas by throttling an intake throttle valve or an exhaust throttle valve.

The invention claimed is:

1. An exhaust gas processing system for an engine in which a particulate removing filter for exhaust gas is provided in an exhaust passage, and in a case of regeneration of the particulate removing filter, an intake throttle valve or an exhaust throttle valve is throttled to a regeneration opening smaller than a normal opening and the valve is returned from the regeneration opening to the normal opening after regenerating the particulate removing filter, and the opening of the intake throttle valve or the exhaust throttle valve in a throttle process from the normal opening to the regeneration opening and a return process from the regeneration opening to the normal opening is changed with an opening change rate which is the time change rate of the opening decreasing or increasing gradually, characterized in that the intake throttle valve or the exhaust throttle valve set at the regeneration opening is returned to the normal opening when acceleration request or loading request is inputted while the regeneration control of the particulate removing filter is performed, wherein the intake throttle valve or the exhaust throttle valve is throttled to regeneration opening again when the acceleration request or the loading request is canceled, the opening change rate is set to a normal opening change rate or a transient opening change rate larger than the normal opening change rate, and the opening change rate at the throttle process and the return process of the intake throttle valve or the exhaust throttle valve is switched from the normal opening change rate to the transient opening change rate in a period after starting the regeneration control of the particulate removing filter from initial input of the acceleration request or the loading request to end of the regeneration control.

2. The exhaust gas processing system for the engine according to claim 1, wherein the opening change rate is switched from the normal opening change rate to the transient opening change rate when the opening of the intake throttle valve or the exhaust throttle valve with the transient opening change rate exceeds that with the normal opening change rate.

* * * * *